United States Patent
Bertch

(10) Patent No.: US 9,202,601 B2
(45) Date of Patent: Dec. 1, 2015

(54) METHODS AND APPARATUS FOR SUPPRESSING TRITIUM PERMEATION DURING TRITIUM PRODUCTION

(75) Inventor: Timothy Creston Bertch, San Diego, CA (US)

(73) Assignee: General Atomics, San Diego, CA (US)

(*) Notice: Subject to any disclaimer, the term of this patent is extended or adjusted under 35 U.S.C. 154(b) by 557 days.

(21) Appl. No.: 13/473,450

(22) Filed: May 16, 2012

(65) Prior Publication Data

US 2012/0294403 A1    Nov. 22, 2012

Related U.S. Application Data

(60) Provisional application No. 61/487,637, filed on May 18, 2011.

(51) Int. Cl.
- *G21C 3/28* (2006.01)
- *G21G 1/02* (2006.01)
- *G21G 1/06* (2006.01)
- *G21G 1/00* (2006.01)

(52) U.S. Cl.
CPC .. *G21G 1/02* (2013.01); *G21C 3/28* (2013.01); *G21G 1/06* (2013.01); *G21G 2001/0094* (2013.01)

(58) Field of Classification Search
CPC ........................................................ G21C 3/28
USPC .......................................... 376/185, 417, 418
See application file for complete search history.

(56) References Cited

U.S. PATENT DOCUMENTS

| | | | |
|---|---|---|---|
| 3,274,066 A * | 9/1966 | Zumwalt | 376/418 |
| 3,276,968 A * | 10/1966 | Ingleby | 376/418 |
| 3,650,896 A * | 3/1972 | Goeddel | 376/417 |
| 3,969,631 A * | 7/1976 | Winsche et al. | 376/185 |
| 4,405,595 A | 9/1983 | Yang et al. | |
| 4,526,741 A * | 7/1985 | Cawley et al. | 376/185 |
| 4,597,936 A * | 7/1986 | Kaae | 376/411 |
| 5,026,516 A | 6/1991 | Taylor | |
| 5,192,495 A * | 3/1993 | Caldwell et al. | 376/417 |
| 5,341,407 A | 8/1994 | Rosenbaum et al. | |
| 6,190,725 B1 * | 2/2001 | Lee et al. | 427/6 |
| 2008/0031398 A1 * | 2/2008 | Lahoda et al. | 376/430 |

(Continued)

FOREIGN PATENT DOCUMENTS

JP    11-202072    * 7/1999

OTHER PUBLICATIONS

Rowberg et al., "97002: The Department of Energy's Tritium Production Program",CRS Issue Brief, 13 pages, available at http://www.fas.org/spp/starwars/crs/97-002.htm (Sep. 16, 1997).

(Continued)

*Primary Examiner* — Jack W Keith
*Assistant Examiner* — Daniel Wasil
(74) *Attorney, Agent, or Firm* — Jones Day; Jaime D. Choi

(57) ABSTRACT

A tritium production element for use in a conventional power reactor, and methods of use and making, are provided, wherein the element experiences reduced tritium permeation during irradiation by incorporating a silicon carbide barrier that encapsulates one or more burnable absorber pellets. The tritium production element includes a tubular cladding that encloses a plurality of burnable absorber pellets, such that individual pellets or groups of pellets are disposed within a silicon carbide barrier layer.

16 Claims, 5 Drawing Sheets

(56) References Cited

U.S. PATENT DOCUMENTS

2009/0032178 A1 2/2009 Feinroth
2009/0238322 A1 9/2009 Liu et al.

OTHER PUBLICATIONS

Sze, Dai-Kai, "Tritium Permeation Issues", Presented at the Apex-Alps Meeting, Albuquerque, New Mexico, 13 pages (Jul. 1998).
Wright et al., "Silicon Carbide Permeation Barriers for Steel Structural Components", Ultamet, available at http://www.sc.doe.gov/sbir/awards_abstracts/sbirsttr/cycle25/phase2/055.htm (last visited Apr. 29, 2011) (2007).
Wright et al., "Silicon Carbide Permeation Barriers for Steel Structural Components", Ultamet, Sandia National Laboratories, 15 pages, available at http://www-fusion.ciemat.es/LMBW/documents/S5_O4.pdf (last visited Apr. 19, 2012) (2007).
"Tritium Production", United States Nuclear Regulatory Commission, Office of Public Affairs, 3 pages (Jun. 2005).
Venable, "Zirconium and its Compounds," American Chemical Society Monograph Series, The Chemical Catalog Company, pp. 63-72 (1922).

* cited by examiner

METHODS AND APPARATUS FOR SUPPRESSING TRITIUM PERMEATION DURING TRITIUM PRODUCTION

I. CROSS-REFERENCE TO RELATED APPLICATIONS

This application claims the benefit of priority of U.S. provisional application Ser. No. 61/487,637, filed May 18, 2011.

II. FIELD OF THE INVENTION

This application generally relates to apparatus and methods for producing tritium in a nuclear reactor, and in particular, a production element having an internal barrier that suppresses tritium permeation through the cladding of the production element.

III. BACKGROUND OF THE INVENTION

Tritium, T or $^3$H, is a radioactive isotope of hydrogen. Tritium is a crucial component of thermonuclear weapons and tritium gas is used in U.S. nuclear warheads to enhance explosive yield. The radioactive decay rate of tritium is 5.5% per year, resulting in a half-life of a little over 12 years. Consequently, it is desirable to provide a stable, safe and efficient supply of tritium for defense and research purposes.

Tritium is separable from lighter isotopes, but only by very tedious, expensive methods. An alternative to tritium isolation is tritium production in which other elements are transmuted to tritium through neutron capture. For example, tritium may be produced by thermal neutron capture by $^6$Li which decays to tritium and helium. Commercial power and research nuclear reactors produce an abundance of thermal neutrons which might potentially be used in producing tritium through neutron capture transmutation reactions. Accordingly, a lithium-containing compound may be disposed in the core of a nuclear reactor to produce tritium.

Particularly suitable lithium-containing compounds for tritium production are the lithium aluminum oxides, $LiAlO_2$ and $LiAl_5O_8$, also referred to as "lithium aluminates," which have high atom percents of lithium and have high melting points (respectively about 1610° C. and 1900° C.). Lithium aluminum oxide may be provided in the form of minute spherical particles as is taught in U.S. Pat. No. 4,405,595 to Yang, assigned to the assignee of the present invention.

One drawback of tritium production using commercial power or research reactors is that tritium is both radioactive and it presents substantial handling difficulties. Like other hydrogen isotopes, tritium diffuses easily through many materials, including the metal cladding used in convention tritium production elements. Early efforts to address tritium permeation focused on encasing the production material in tritium-impermeable container. As such method, described in the above-mentioned patent to Yang, involves coating a particulate material, such as lithium aluminum oxide, with a tritium-impermeable shell. In particular, lithium aluminum oxide particles are coated with a tristructural isotopic (TRISO) coating similar to that used to coating nuclear fuel particles in research-style reactors. Such coatings consist of a layer of porous carbon, a layer of an isotropic dense carbon, a layer of silicon carbide, and a layer of an isotropic dense carbon. However, such previously-known arrangements require substantial post-irradiation processing.

Likewise, U.S. Pat. No. 4,597,936 to Kaae, assigned to the assignee of the present invention, discloses a lithium-containing neutron target particle for breeding tritium within the core of a nuclear reactor, including a central core formed of a stable lithium-containing compound, a surrounding buffer layer, and an outer tritium-impermeable silicon carbide coating. The core is initially sealed with an inner sealing layer of pyrolytic carbon and an outer sealing layer of stoichiometric zirconium carbide.

Tritium production elements, such as described in the above patents, generally are not used in commercial power reactors due to the low relative loading of lithium. For this reason, until 1993, most tritium production in the United States was undertaken at the Savannah River production reactor, under the auspices of the U.S Department of Energy.

Since about 2005, efforts have been underway to develop tritium production rods for use in commercial power reactors, such as those belonging to the Tennessee Valley Authority. The tritium production rods employed in those efforts are referred to as "TPBARs" or "tritium producing burnable absorber rods" and comprise stacks of lithium aluminate disposed within a stainless steel cladding. However, due to the high permeability of tritium in stainless steel, such designs have required increased emphasis on tritium extraction from the reactor coolant, and also pose a risk to conventional zirconium alloy clad fuel assemblies in the power reactor, as described below.

Efforts to employ barriers to reduce hydrogen and tritium permeation in conventional nuclear fuel cladding also are known in the art. For example, it has long been known that zirconium alloy cladding, used in most commercial power reactors, is susceptible to hydrogen embrittlement, wherein high levels of hydrogen permeation into the cladding thickness can reduce the structural integrity of the cladding. Accordingly, prior art patents, such as U.S. Pat. No. 5,026,516 to Taylor and U.S. Pat. No. 5,341,407 to Rosenbaum describe the use of a pure zirconium barrier within a zirconium alloy tube to reduce hydrogen uptake and embrittlement from within the fuel rod. Likewise, U.S. Patent Application Pub. No. 2009/0238322 to Liu discloses a fuel assembly for a nuclear reactor wherein the fuel rods include hollow gas absorber structures, referred to as "getters", which are disposed within the fuel rods to absorb and retain hydrogen and tritium. The presence of high tritium levels outside the cladding, e.g., released by TPBARs located within the reactor, may lead to cladding embrittlement from the outside in.

U.S. Patent Application Pub. No. 2009/0032178 to Feinroth discloses a nuclear fuel cladding intended to overcome the disadvantages of zirconium-based fuel claddings, and in particular, the exothermic corrosion of zirconium alloys that occurs when a heated fuel rod is exposed to air or steam. Feinroth describes a nuclear fuel cladding comprising a multi-layered ceramic tube having an inner layer of high purity beta phase stoichiometric silicon carbide, a central composite layer of continuous beta phase stoichiometric silicon carbide fibers, and an outer layer of fine-grained silicon carbide.

Tritium permeation also has been hypothesized to pose problems for advanced reactor designs, such as fusion reactors, in which deuterium and tritium are combined in a fusion reaction to generate helium. For example, Sandia National Laboratories (Albuquerque, N. Mex.) describes, in a publication entitled "Silicon Carbide Permeation Barrier for Steel Structural Components", a tritium permeation barrier for steel structural components of a fusion reactor, in which a silicon carbide coating and a compliant foam interlayer are disposed within a ferritic steel tube. That publication is directed to addressing tritium permeation barriers in the context of nuclear fusion reactor components, and is not concerned with tritium production in conventional power reactors.

In view of the above-noted drawbacks of previously-known systems, it would be desirable to provide a tritium production element that experiences reduced permeation, thereby permitting safe and economical production of tritium in conventional nuclear power reactors.

Due to the long lead times needed to obtain regulatory approval for new reactor designs and due to the relatively short half-life of tritium, it would be particularly desirable to provide methods and apparatus for producing tritium suitable for use with existing reactor facilities and modes of operation.

Further, it would be desirable to provide methods and apparatus for producing tritium that is compatible with zirconium alloy based nuclear cladding used in current commercial power reactors.

IV. SUMMARY OF THE INVENTION

The present invention overcomes the drawbacks of previously-known systems by providing tritium production elements and methods for generating tritium using conventional nuclear power reactors, while reducing issues associated with tritium permeation through the cladding of the production elements.

In accordance with one aspect of the present invention, a tritium production element is provided comprising a tritium production burnable absorber rod ("TPBAR") having an internal barrier layer comprising silicon carbide (SiC). In one embodiment, the tritium production element comprises a cylindrical cladding, e.g., stainless steel, that encloses a plurality of burnable absorber, e.g., lithium aluminate, pellets, and at least one silicon carbide coating disposed on the pellets. The cylindrical cladding has a length and an inner diameter, and the pellets may have an outer diameter dimensioned to fit within the inner diameter of the cladding with a predetermined gap. The plurality of pellets may be arranged in an end-to-end relation and at least some of the plurality of pellets may have an annular configuration. The silicon carbide barrier may be disposed within the gap and constitute a coating or container that hermetically encloses one or more of the plurality of pellets. Advantageously, it is expected that the silicon carbide barrier may suppress or even eliminate tritium permeation of the production element cladding during irradiation, thereby reducing release of tritium to the reactor coolant and reducing uptake by adjacent fuel assemblies in the nuclear reactor.

In accordance with another aspect of the present invention, a tritium production assembly is provided for use in a nuclear reactor wherein the assembly comprises a plurality of the tritium production elements arranged in a bundle. The bundle may have hydraulic characteristics substantially the same as a fuel bundle used in the nuclear reactor such that the tritium production assembly may be used substituted for a fuel bundle in a fuel assembly without retooling or effecting the hydraulic performance of adjacent fuel bundles. In one embodiment, the cylindrical cladding of the tritium production element has outer dimensions substantially the same as the outer dimensions of a fuel rod used within the nuclear reactor.

Also provided herein are methods for making a tritium production element in accordance with the present invention. The silicon carbide barrier may be deposited on one or a group of burnable absorber pellets, or the internal diameter of the production element cladding, by any of several known coating techniques, including chemical vapor deposition, plasma vapor deposition, or sputtering. Preferably, the silicon carbide barrier substantially fills the predetermined gap and may have a thickness of between about 200 microns and 500 microns. In one embodiment, the silicon carbide barrier comprises a free-standing container configured to be sealed after one or more burnable absorber pellets, such as lithium aluminate pellets, are disposed within the container.

The silicon carbide barrier may be used to seal selected numbers of the burnable absorber pellets. For example, each one of the plurality of pellets may be sealed within a corresponding silicon carbide barrier coating. Alternatively, a plurality of pellets may be formed into an end-to-end stack and then sealed within a corresponding silicon carbide barrier.

V. BRIEF DESCRIPTION OF THE DRAWINGS

VI. DETAILED DESCRIPTION OF THE INVENTION

Figure 1:
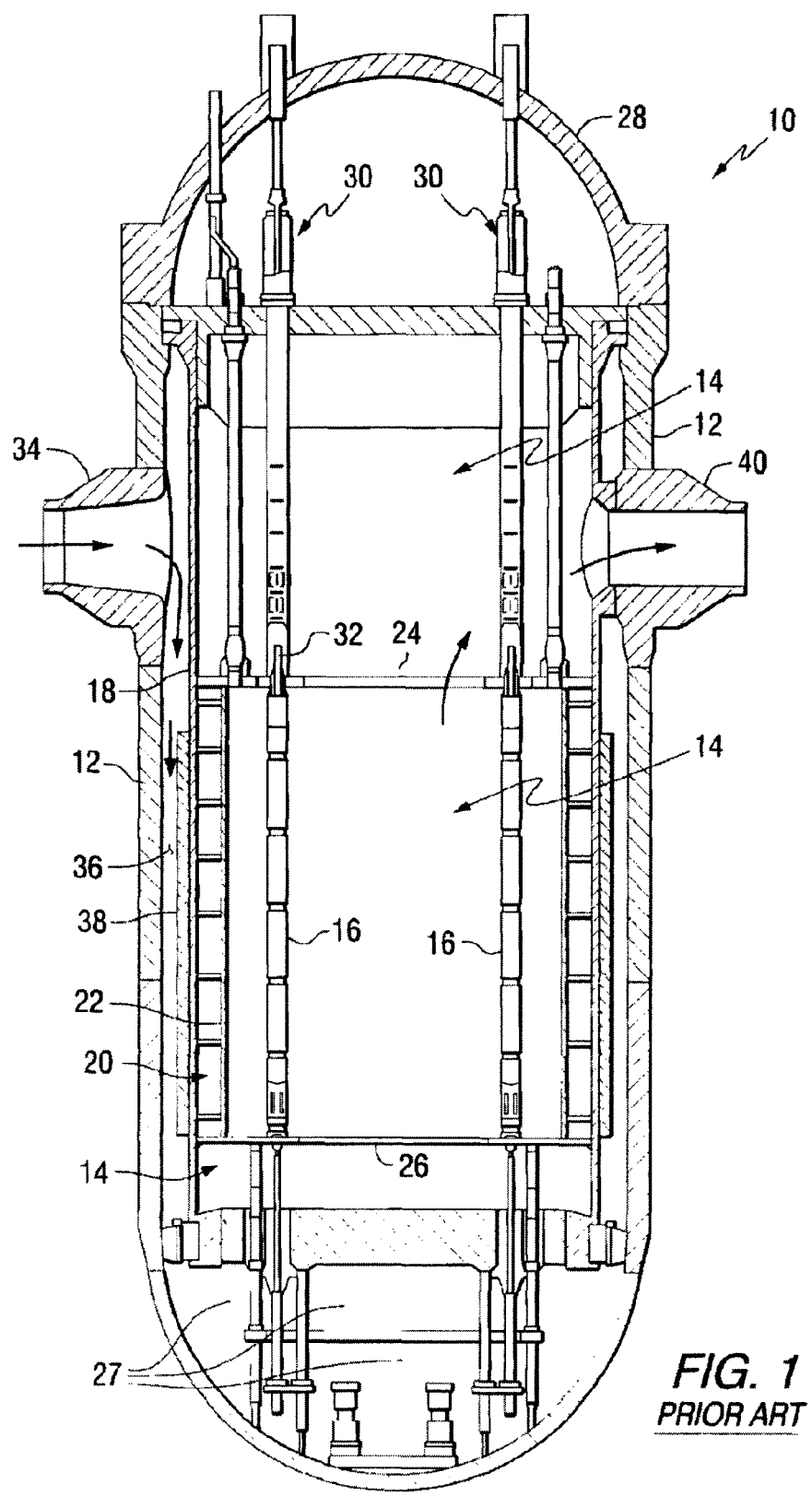
FIG. 1 is an elevation view, in section, of a prior art pressurized water nuclear reactor (PWR) suitable for use with the tritium production elements of the present invention.

Referring to FIG. 1, conventional pressurized water nuclear reactor (PWR) 10, one of many suitable prior art reactor types, is described as a suitable power reactor for hosting a tritium production assembly constructed in accordance with the principles of the present invention. PWR 10 illustratively includes reactor pressure vessel 12, nuclear reactor core 14, fuel assemblies 16, cylindrical core barrel 18, baffle structure 20, baffle plates 22, upper and lower core plates 24, 26, bottom reactor cooling plenum 27, removable closure head 28, control rod drive mechanisms 30, rod cluster control assembly mechanism 32, coolant inlet nozzles 34, annular region 36, thermal shield 38, and outlet nozzles 40.

Reactor pressure vessel 12 houses nuclear reactor core 14, which comprises a plurality of elongated fuel assemblies 16, each typically including fuel rods arranged in an array of either 14×14 or 17×17 rods. Relatively few fuel assemblies 16 are shown in FIG. 1 for purposes of simplicity. In reality, core 14 is composed of a great number of fuel assemblies 16, typically 150 or 250 fuel assemblies, depending upon the number of fuel rods in each fuel assembly.

Spaced radially inwardly from reactor vessel 12 is a generally cylindrical core barrel 18 and within barrel 18 is baffle structure 20. Baffle structure 20 surrounds fuel assemblies 16 of reactor core 14. Typically, baffle structure 20 is made of baffle plates 22 joined together by bolts (not shown). Reactor core 14 and baffle structure 20 are disposed between upper and lower core plates 24, 26 which, in turn, are supported by core barrel 18. The upper end of reactor pressure vessel 12 is hermetically sealed by removable closure head 28 upon which are mounted a plurality of control rod drive mechanisms 30. Again, for simplicity, only a few of the many control rod drive mechanisms 30 are shown. Each drive mechanism 30 selectively positions a rod cluster control assembly mechanism 32 above and within some of fuel assemblies 16.

A nuclear fission process carried out in fuel assemblies 16 of reactor core 14 produces heat which is removed during operation of the PWR by circulating a coolant fluid, such as light water with soluble boron, through core 14. More specifically, the coolant fluid is typically pumped into reactor pressure vessel 12 through a plurality of coolant inlet nozzles 34 (only one of which is shown in FIG. 1). The coolant fluid enters the reactor vessel through coolant inlet nozzles 34, and passes downward through annular region 36 defined between reactor vessel 12 and core barrel 18 (and thermal shield 38 on the core barrel) until it reaches the bottom reactor cooling plenum 27 of reactor vessel 12 where the coolant turns 180 degrees prior to following up through lower core plate 26 and then up through reactor core 14. The coolant then passes through upper core plate 24 and exits the reactor vessel 12 through outlet nozzles 40.

The coolant fluid is heated to reactor operating temperatures by the transfer of heat energy from fuel assemblies 16 to the fluid. The hot coolant fluid then exits reactor vessel 12 through a plurality of outlet nozzles 40 (only one being shown in FIG. 1) extending through core barrel 18. Thus, heat energy which fuel assemblies 16 impart to the coolant fluid is carried off by the fluid from pressure vessel 12.

Figure 2:
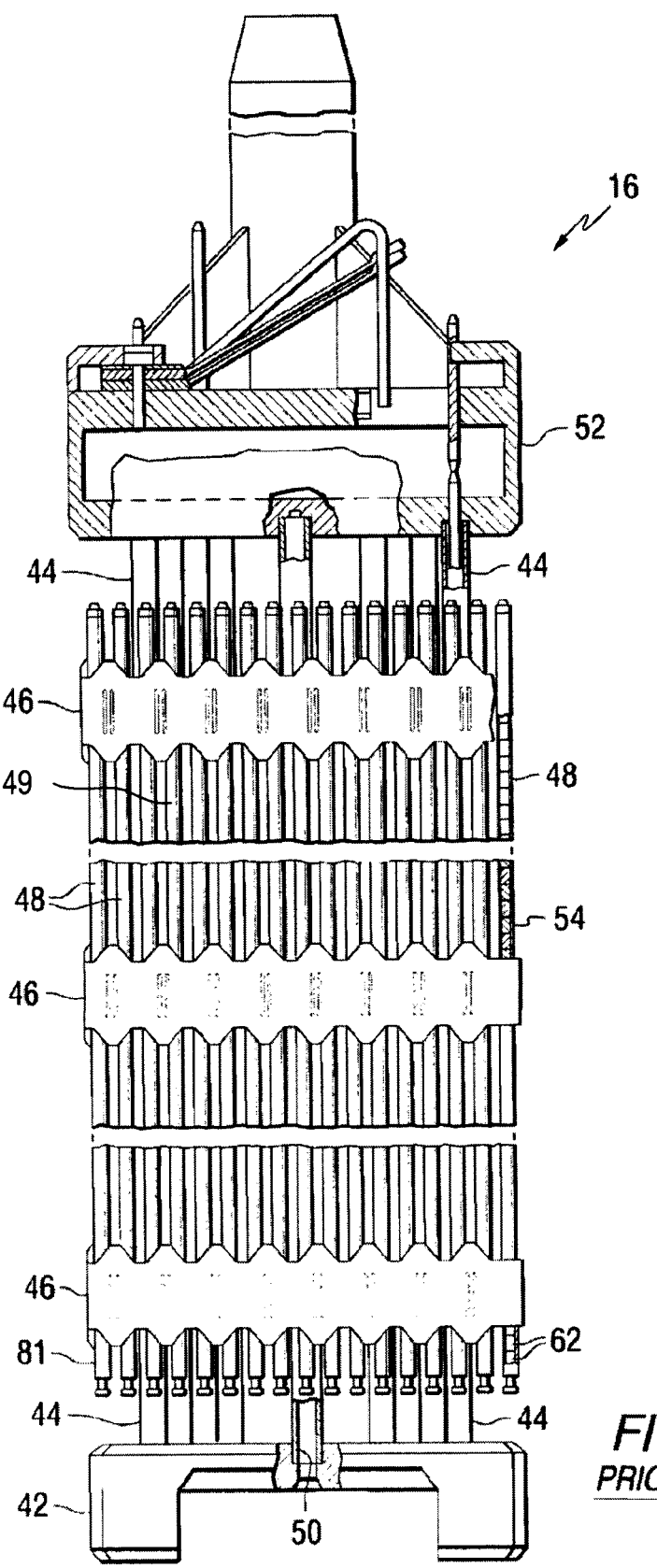
FIG. 2 is an elevation view, partly in section, of a prior art nuclear assembly such as may be used in the reactor of FIG. 1.

Referring now to FIG. 2, each fuel assembly 16, being of the type used in a PWR, illustratively includes bottom nozzle 42, guide thimbles 44, support grids 46, fuel rods 48, bundle 49, instrumentation tube 50, top nozzle 52, and absorber structure location 81. Each fuel assembly 16 typically includes a lower end structure or bottom nozzle 42 which supports the assembly on lower core plate 26 (shown in FIG. 1) and a number of longitudinally extending guide tubes or thimbles 44 which project upwardly from bottom nozzle 42. Fuel assembly 16 further includes a plurality of transverse support grids 46 axially spaced along the lengths of guide thimbles 44 and attached thereto. Grids 46 transversely space and support a plurality of fuel rods 48 in an organized bundle 49. Bundle 49 illustratively includes 17×17 (289) fuel rods 48. Additionally, fuel assembly 16 includes instrumentation tube 50 located in the center thereof and an upper end structure or top nozzle 52 attached to the upper ends of guide thimbles 44.

In accordance with one aspect of the present invention, a plurality of tritium production elements, described in detail below, are arranged in an array similar to that of the fuels rods depicted in FIG. 2, such that the resulting tritium production assembly may be substituted for selected fuel assemblies within reactor core 14 without adversely effecting the thermal-hydraulic or overall nuclear physics of the reactor. In this manner, it is expected that up to sixteen tritium production assemblies may be irradiated in a commercial power reactor during a typical reactor power cycle, and retrieved at scheduled reactor outages for further processing to recover the tritium thus generated.

Figure 3:
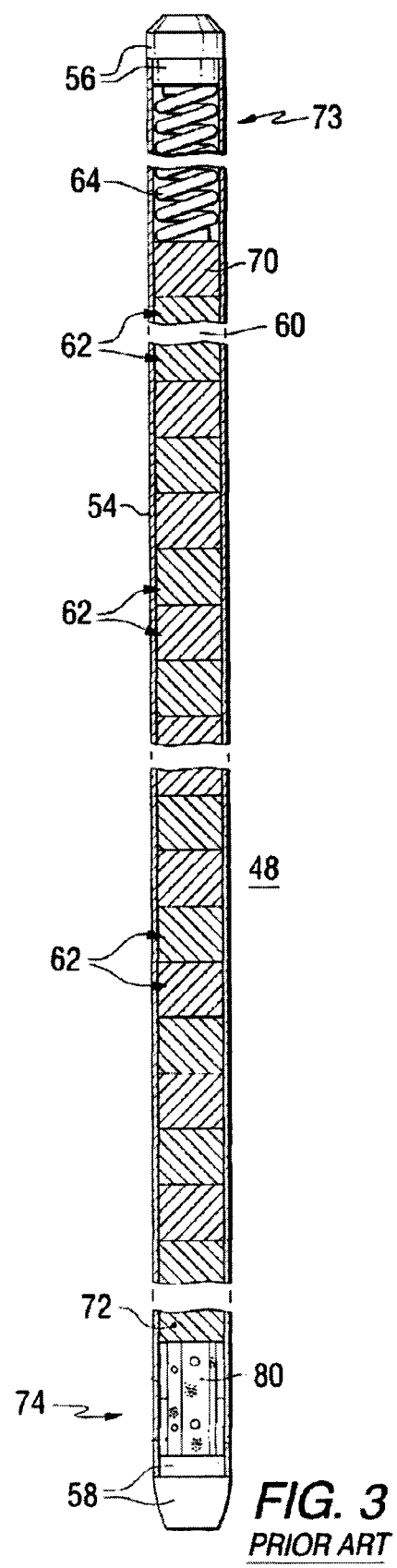
FIG. 3 is an enlarged foreshortened elevation sectional view of a prior art tritium-producing burnable absorber rod (TPBAR).

Referring now to FIG. 3, a previously-known tritium production element or "TPBAR" comprising a stack of burnable absorber pellets is described. The TPBAR depicted in FIG. 3 is similar to those under study at the Savannah River National Laboratory, Aiken, S.C. TPBAR 48 includes elongated hollow stainless steel cladding 54, top end plug 56, bottom end plug 58, sealed chamber 60, a plurality of burnable absorber pellets 62, such as lithium aluminate pellets, spring 64, top pellet 70, bottom pellet 72, top 73, bottom 74, and optional getter assembly 80. Top end plug 56 and bottom end plug 58 are attached to and seal opposite ends of cladding 54 to define a sealed chamber shown generally as 60 therein. A plurality of burnable absorber pellets 62, illustratively lithium aluminate pellets, are stacked in an end-to-end abutting arrangement within chamber 60 and held in place by spring 64 disposed between top pellet 70 and top end plug 56. Optional getter assembly 80, if present, is disposed between bottom end plug 58 and bottom pellet 72. As discussed above, the TPBAR configuration shown in FIG. 3 is highly susceptible to tritium permeation, resulting in loss of tritium through cladding 54 into the reactor coolant, and further potentially adversely effecting the integrity of adjacent fuel assemblies.

Figure 4A:
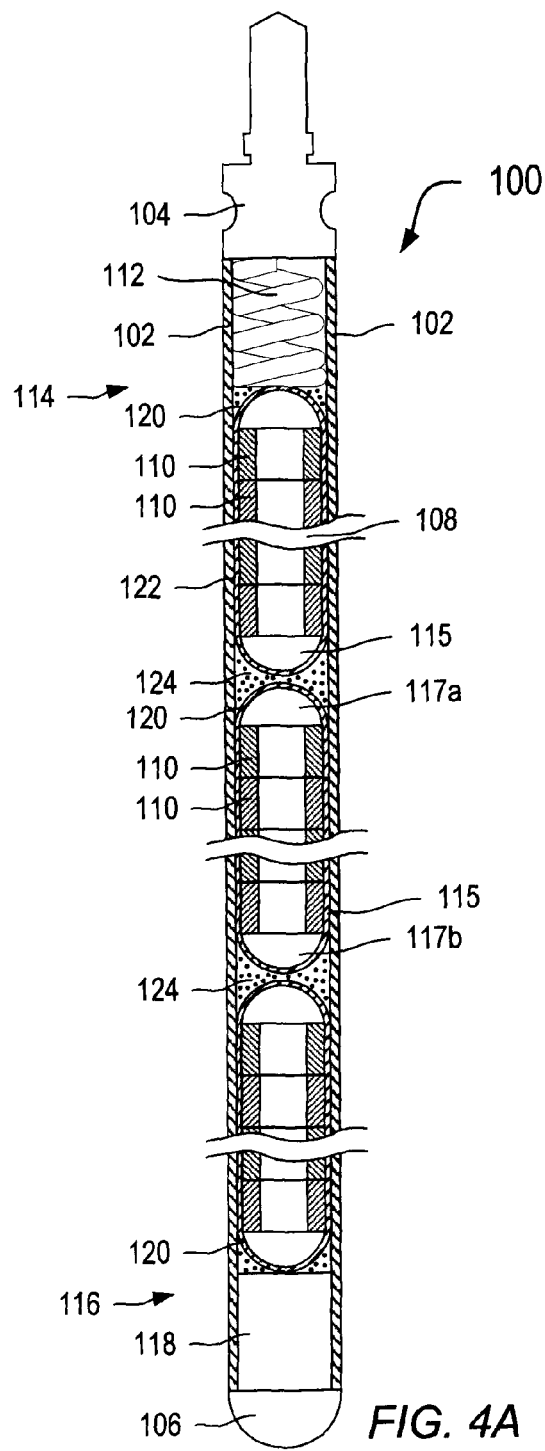
FIGS. 4A and 4B are enlarged foreshortened elevation sectional schematic views of exemplary tritium production elements having silicon carbide barriers constructed in accordance with the present invention.
Figure 4B:
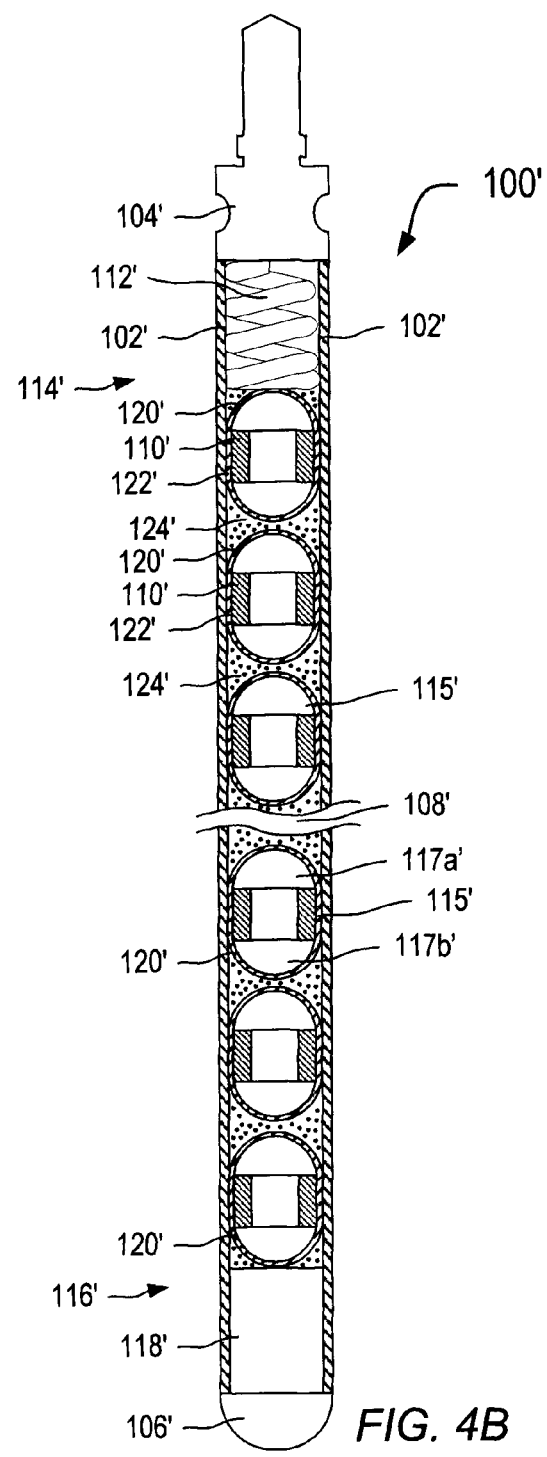

Referring now to FIGS. 4A and 4B, exemplary tritium production elements 100 and 100' constructed in accordance with the principles of the present invention are described. In FIGS. 4A and 4B, like elements are described with like-primed numbers. Tritium production elements 100 and 100' are similar in construction to TPBAR 48 of FIG. 3, but in addition include silicon carbide capsules or barriers 120 (120') disposed to seal individual burnable absorber pellets or groups of burnable absorber pellets. Tritium production element 100 preferably includes cylindrical cladding 102 and top end plug 104 and bottom end plug 106 forming sealed chamber 108, and includes burnable absorber pellets 110, spring 112, top 114, capsules 115, bottom 116, optional getter assembly 118, silicon carbide barrier 120, gap 122, and optional spacer 124.

Cladding 102 has top end plug 104 and bottom end plug 106 attached to and sealing opposite ends of cladding 102, thereby defining a sealed chamber shown generally as 108. Cladding 102 has a length and an inner diameter and may comprise, for example, stainless steel type 316. A plurality of burnable absorber pellets 110, preferably, for example, lithium aluminate pellets comprising compacted or sintered particles as described in the above-mentioned U.S. Pat. No. 4,597,936, are stacked within cladding 102 in an end-to-end arrangement. Each pellet 110 may have an annular configuration and may have an outer diameter dimensioned to fit within the inner diameter of cladding 102 with a predetermined gap 122. Pellets 110 may be held in place by the action of spring 112 or like device 112 disposed in chamber 108 near top 114 between uppermost pellet 110 and top end plug 104. Optional getter assembly 118 may be disposed near bottom 116 between bottom end plug 106 and lowermost pellet 110 in the stack. As is conventional, getter assembly 118 may be configured to absorb and retain any residual gases contained within cladding 102 during manufacture of the tritium production element.

Still referring to FIG. 4A, and in accordance with one aspect of the present invention, tritium production element 100 further includes silicon carbide barrier(s) 120 disposed within gap 122 between cladding 102 and a subset of pellets 110. In a preferred embodiment, silicon carbide barrier 120 forms a coating disposed on the exterior of a plurality of lithium aluminate pellets 110 to form separate capsules 115 that substantially hermetically contain tritium produced during irradiation of the pellets 110. As depicted in FIG. 4A, silicon carbide barrier 120 may substantially fill gap 122. Advantageously, it is expected that silicon carbide barrier 120 may suppress or even eliminate tritium permeation and loss from rod 100 during irradiation. Spacer 124, which may comprise an insert ceramic component, is configured to hold adjacent capsules 115 in alignment when disposed within cladding 102. It should be appreciated that capsules 115 as depicted in FIG. 4A need not, and preferably may not, include rounded upper and lower plenum regions 117a and 117b. Instead, as described in detail below, capsules 115 may be formed by depositing silicon carbide material directly onto the exterior surface of pellets 110 to form a coating that substantially follows the exterior contours of pellets 110.

Referring to FIG. 4B, tritium production element 100' is constructed substantially identically to tritium production element 100 of FIG. 4A, wherein like components are identified by like-primed reference numbers. Thus, for example, silicon carbide barrier 120' in FIG. 4B corresponds to silicon carbide barrier 120 of the embodiment of FIG. 4A, etc. As will be observed by comparing FIGS. 4A and 4B, the silicon carbide barrier of the present invention may be used to seal various numbers of burnable absorber pellets 110 or 110'. For example, a plurality of pellets 110 are sealed within a corresponding capsule 115 in the embodiment of FIG. 4A. However, in the embodiment of FIG. 4B, each burnable absorber pellet 110' is depicted as sealed within a corresponding capsule 115'. In a preferred variation of the embodiment of FIG. 4A, eleven lithium aluminate pellets 110 are sealed within silicon carbide barrier 120 to form capsule 115, such that silicon carbide barrier 120 has a thickness of between about 200 microns and 500 microns.

As discussed hereinabove, a plurality of tritium production elements 110 or 110' may be arranged to form a bundle, as depicted in FIG. 2, for use in a commercial power reactor such as PWR 10 of FIG. 1. In particular, tritium production elements 100 and/or 100' may be arranged in an array of 17×17 (289) tritium production elements, although other configurations are within the scope of the present invention. Preferably, the bundle has hydraulic characteristics substantially the same as a fuel bundle used in the nuclear reactor, and may be used interchangeably with fuel assembly 16 of FIG. 2 at selected locations within the reactor core. In one embodiment, cladding 102 has outer dimensions substantially the same as the outer dimensions of a fuel rod used within the nuclear reactor.

Figure 5:
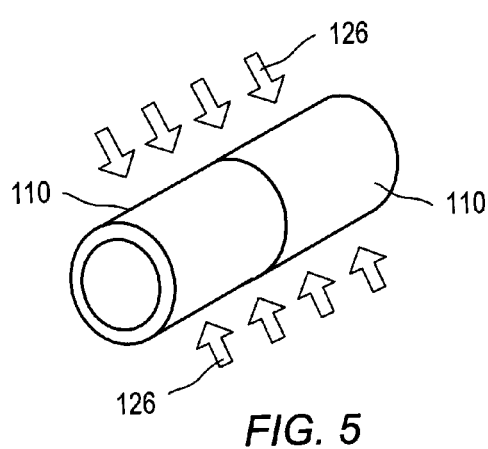
FIG. 5 illustrates an exemplary method of making a silicon carbide coated burnable absorber pellet in accordance with one aspect of the present invention.

The present invention further provides methods of making tritium production elements 100 and 100' including silicon carbide barriers 120 and 120'. Referring now to FIG. 5, a first exemplary method of a tritium production element having a silicon carbide barrier is described. In FIG. 5, a silicon carbide coating is disposed on one or more burnable absorber pellets 110 using coating method 126, which may comprise chemical vapor deposition (CVD), plasma vapor deposition (PVD), or sputtering. In FIG. 5, a silicon carbide coating is illustratively deposited on two pellets 110, although, as will be appreciated by one of ordinary skill in the art, the coating may be deposited to form a capsule on more or fewer pellets 110. Optionally, a layer of material that is nonreactive to the coating process, such as a layer of pure zirconium, may be applied to pellets 110 prior to deposition of the silicon carbide barrier to protect the burnable absorber.

Figure 6:
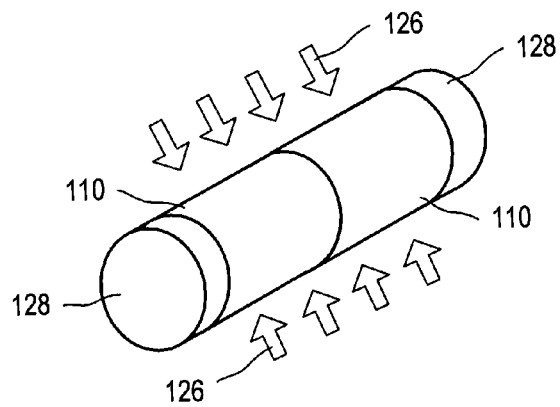
FIG. 6 illustrates an alternative method of making a silicon carbide barrier by depositing silicon carbide on one or more burnable absorber pellets using a coating method and silicon carbide end caps.

Referring to FIG. 6, an alternative method of applying a silicon carbide barrier to a plurality of burnable absorber pellets is described. In this embodiment, silicon carbide end caps 128 are disposed at the outer ends of a stack of pellets 110 before depositing silicon carbide using a coating method 126, such as CVD, PVD, sputtering or other suitable technique. In this manner, suitable tooling may be configured to contact silicon carbide endcaps 128 and hold pellets 110 in a predetermined position during deposition of the silicon carbide coating, such that endcaps become an integral component of the resulting capsule. In FIG. 6, silicon carbide is illustratively deposited on two pellets 110, although, as will be appreciated by one of ordinary skill in the art, the silicon carbide coating may be deposited on more or fewer pellets.

Alternatively, the silicon carbide barrier may be applied to the inner diameter of the stainless steel cladding 102, top end plug 104 and bottom end plug 106 prior to loading the cladding with pellets 110.

Figure 7A:
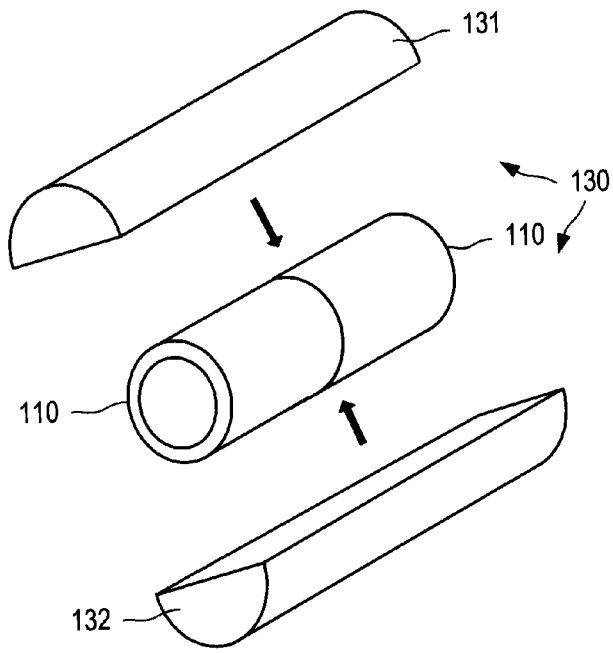
FIGS. 7A and 7B illustrate an embodiment for making a silicon carbide barrier having a joint by sealing free-standing containers around one or more burnable absorber pellets.
Figure 7B:
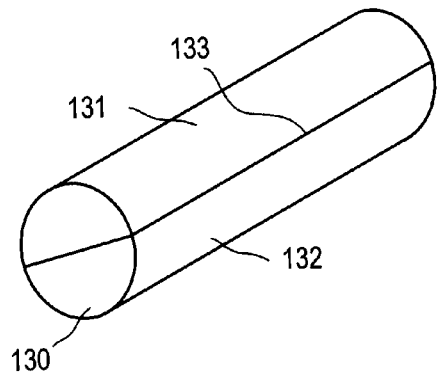

Referring now to FIGS. 7A and 7B, a further method of making a tritium production element in accordance with the present invention is described, in which capsules 115 or 115' are disposed within cladding 102 or 102' after the silicon carbide barrier is applied. In this embodiment, silicon carbide barrier 130 illustratively comprises halves 131 and 132 that are joined along joint 133. As shown in FIG. 7A, silicon carbide barrier 130 may comprise two free-standing halves 131 and 132 that are configured to be sealed together after being loaded with one or more burnable absorber pellets 110. Halves 131 and 132 may be sealed using a suitable joining technique, such as chemical bonding, to create joint 133 as shown in FIG. 7B. As will be appreciated by one of ordinary skill in the art, more or fewer pellets 110 may be loaded between halves 131 and 132. In addition, the components of the silicon carbide barrier may be comprise different geometric shapes, e.g., such as a tubular member and endplugs, which may be sealed to create more than one joint.

After application of a silicon carbide barrier layer as described above with respect to FIGS. 5 through 7, a tritium production element of the present invention is completed by loading the resulting barrier-sealed capsules into cladding 102 or 102', adding spring 112 or 112' and an optional getter assembly, and sealing the element by applying top and bottom end plugs using conventional welding techniques. In a preferred embodiment, the stainless steel cladding may be heated to a suitable temperature prior to loading the burnable absorber capsules so that the cladding expands to create a preselected gap 122 to facilitate capsule loading. Once the burnable absorber capsules are loaded within the cladding, the cladding is allowed to cool, such that the outer surface of silicon carbide barrier contacts the inner surface of the cladding.

While various illustrative embodiments of the invention are described above, it will be apparent to one skilled in the art that various changes and modifications may be made therein without departing from the invention. The appended claims are intended to cover all such changes and modifications that fall within the true scope of the invention.

What is claimed:

1. A tritium production element for use in a nuclear reactor, comprising:
   a substantially cylindrical cladding having a length and an inner diameter;
   a plurality of tritium producing burnable absorber pellets disposed within the cladding, each pellet of the plurality including a first surface, a second surface, and a substantially cylindrical sidewall extending between the first surface and the second surface, the sidewall including an outer diameter dimensioned to fit within the inner diameter of the cladding, the plurality of pellets arranged in an end-to-end relation; and
   at least one silicon carbide barrier substantially hermetically sealing tritium within the pellets of the plurality, each of the at least one silicon carbide barriers including a first portion arranged radially over the first surface of at least one of the pellets of the plurality, a second portion arranged radially over the second surface of at least one of the pellets of the plurality, and a sidewall portion axially extending between the first portion and the second portion, the sidewall portion being concentrically arranged between the substantially cylindrical sidewall of at least one of the pellets of the plurality and the substantially cylindrical cladding, wherein the at least one silicon carbide barrier comprises a free-standing container into which one or more of the tritium producing burnable absorber pellets are sealed.

2. The tritium production element of claim 1, wherein each one of the plurality of tritium producing burnable absorber pellets is sealed within a corresponding silicon carbide barrier.

3. The tritium production element of claim 1, wherein a plurality of tritium producing burnable absorber pellets is sealed within a corresponding silicon carbide barrier.

4. The tritium production element of claim 1, wherein at least some of the plurality of tritium producing burnable absorber pellets have an annular configuration.

5. The tritium production element of claim 1, wherein the sidewall portion of each of the at least one silicon carbide barriers contacts the substantially cylindrical cladding.

6. The tritium production element of claim 1, wherein the at least one silicon carbide barrier has a thickness of between about 200 micron and 500 micron.

7. The tritium production element of claim 1, wherein the cylindrical cladding has outer dimensions substantially the same as the outer dimensions of a fuel rod used within the nuclear reactor.

8. The tritium production element of claim 1, wherein the tritium producing burnable absorber pellets comprise lithium aluminate.

9. A tritium production assembly for use in a nuclear reactor, comprising:
a plurality of tritium production elements arranged in a bundle, the bundle having hydraulic characteristics substantially the same as a fuel bundle used in the nuclear reactor, wherein each tritium production element comprises:
a substantially cylindrical cladding having a length and an inner diameter;
a plurality of tritium producing burnable absorber pellets disposed within the cladding, each pellet of the plurality including a first surface, a second surface, and a substantially cylindrical sidewall extending between the first surface and the second surface, the sidewall including an outer diameter dimensioned to fit within the inner diameter of the cladding, the plurality of pellets arranged in an end-to-end relation; and
at least one silicon carbide barrier substantially hermetically sealing tritium within the pellets of the plurality, each of the at least one silicon carbide barriers including a first portion arranged radially over the first surface of at least one of the pellets of the plurality, a second portion arranged radially over the second surface of at least one of the pellets of the plurality, and a sidewall portion axially extending between the first portion and the second portion, the sidewall portion being concentrically arranged between the substantially cylindrical sidewall of at least one of the pellets of the plurality and the substantially cylindrical cladding,
wherein, within each tritium production element, the at least one silicon carbide barrier comprises a free-standing container into which one or more of the tritium producing burnable absorber pellets are sealed.

10. The tritium production assembly of claim 9, wherein, within each tritium production element, each one of the plurality of tritium producing burnable absorber pellets is sealed within a corresponding silicon carbide barrier.

11. The tritium production assembly of claim 9, wherein, within each tritium production element, a plurality of tritium producing burnable absorber pellets is sealed within a corresponding silicon carbide barrier.

12. The tritium production assembly of claim 9, wherein, within each tritium production element, at least some of the plurality of tritium producing burnable absorber pellets has an annular configuration.

13. The tritium production assembly of claim 9, wherein, within each tritium production element, the sidewall portion of each of the at least one silicon carbide barriers contacts the substantially cylindrical cladding.

14. The tritium production assembly of claim 9, wherein, within each tritium production element, the at least one silicon carbide barrier has a thickness of between about 200 microns and 500 microns.

15. The tritium production assembly of claim 9, wherein the tritium producing burnable absorber pellets comprise lithium aluminate.

16. The tritium production assembly of claim 15, wherein a majority of the tritium production elements within the assembly have cylindrical cladding having outer dimensions substantially the same as the outer dimensions of fuel rods used within the nuclear reactor.

* * * * *